US008553963B2

(12) United States Patent
Rauch et al.

(10) Patent No.: US 8,553,963 B2
(45) Date of Patent: Oct. 8, 2013

(54) DIGITAL SUBTRACTION ANGIOGRAPHY (DSA) MOTION COMPENSATED IMAGING SYSTEM

(75) Inventors: John Christopher Rauch, Warwick, RI (US); John Baumgart, Hoffman Estates, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 129 days.

(21) Appl. No.: 13/252,238

(22) Filed: Oct. 4, 2011

(65) Prior Publication Data

US 2012/0201439 A1 Aug. 9, 2012

Related U.S. Application Data

(60) Provisional application No. 61/440,892, filed on Feb. 9, 2011.

(51) Int. Cl.
*G06K 9/00* (2006.01)
*A61B 6/00* (2006.01)

(52) U.S. Cl.
USPC .............................. 382/131; 382/221; 378/21

(58) Field of Classification Search
USPC .......... 382/100, 103, 128–134, 162, 168, 173, 382/181, 199, 219, 232, 254, 274, 276, 305, 382/312, 221; 600/419, 407; 378/8, 21
See application file for complete search history.

(56) References Cited

U.S. PATENT DOCUMENTS

| 7,403,810 | B2 * | 7/2008 | Li et al. ........................ 600/419 |
| 7,409,078 | B2 * | 8/2008 | Pescatore et al. ............. 382/130 |
| 7,519,412 | B2 * | 4/2009 | Mistretta ....................... 600/407 |
| 7,545,901 | B2 | 6/2009 | Mistretta |
| 7,782,998 | B2 * | 8/2010 | Langan et al. ..................... 378/8 |
| 8,023,732 | B2 * | 9/2011 | Deuerling-Zheng et al. . 382/168 |
| 8,077,952 | B2 * | 12/2011 | Baumgart ..................... 382/130 |
| 2007/0009080 | A1 | 1/2007 | Mistretta |
| 2008/0009698 | A1 | 1/2008 | Boese |
| 2008/0037845 | A1 | 2/2008 | Deuerling-Zheng et al. |
| 2008/0247503 | A1 | 10/2008 | Lauritsch |
| 2008/0317323 | A1 | 12/2008 | Kinnstaetter et al. |
| 2009/0016587 | A1 | 1/2009 | Strobel |
| 2009/0088632 | A1 | 4/2009 | Khamene et al. |
| 2009/0090873 | A1 | 4/2009 | Sapp et al. |
| 2009/0297004 | A1 | 12/2009 | Baumgart |

(Continued)

OTHER PUBLICATIONS

Co-pending U.S. Appl. No. 13/026,417, filed Feb. 14, 2011.

*Primary Examiner* — Seyed Azarian
(74) *Attorney, Agent, or Firm* — Peter R. Withstandley (57) ABSTRACT

A motion compensated digitally subtracted Angiography (DSA) image processing system includes an interface for acquiring a sequence of images of patient vessels both prior to and following introduction of contrast agent into the vessels. An image data processor automatically, (a) determines a first shift vector for a first image of the sequence for compensating for shift between the first image and a first reference image of the sequence, (b) applies the determined first shift vector to the first image of the sequence to produce a shifted image, (c) subtracts the first reference image from the shifted image to produce a subtracted image enhancing vessel structure, (d) determines a second shift vector for compensating for shift between the subtracted image and a second reference image and (e) shifts content of the subtracted image relative to the second reference image in response to the second shift vector, to provide a shifted subtracted image enhancing and aligning vessel structure.

23 Claims, 5 Drawing Sheets

(56) References Cited

U.S. PATENT DOCUMENTS

| | | |
|---|---|---|
| 2009/0310825 A1 | 12/2009 | Bontus et al. |
| 2010/0034446 A1 | 2/2010 | Zhu et al. |
| 2010/0053209 A1 | 3/2010 | Rauch |
| 2010/0121183 A1 | 5/2010 | Taguchi et al. |
| 2010/0171819 A1 | 7/2010 | Tolkowsky et al. |
| 2010/0172556 A1 | 7/2010 | Cohen |
| 2010/0195888 A1 | 8/2010 | Bruder |
| 2010/0222671 A1 | 9/2010 | Cohen et al. |
| 2010/0259550 A1 | 10/2010 | Baumgart et al. |
| 2011/0299749 A1 | 12/2011 | Rauch |

* cited by examiner

DIGITAL SUBTRACTION ANGIOGRAPHY (DSA) MOTION COMPENSATED IMAGING SYSTEM

This is a non-provisional application of provisional application Ser. No. 61/440,892 filed Feb. 9, 2011, by J. Rauch et al.

FIELD OF THE INVENTION

This invention concerns a system for motion compensated digitally subtracted Angiography (DSA) image processing involving calculating and using multiple different shift vectors associated with acquired images and associated derived DSA images.

BACKGROUND OF THE INVENTION

Digital Subtraction Angiography (DSA) imaging is used in interventional medicine to diagnose vascular disease or abnormality in patients and is also used subsequent to treatment to document the effectiveness of treatment. In acquiring DSA images in the abdominal region, multiple motion fields are present. Patient respiration produces a pixel-shift or slight movement associated with the spine and posterior ribs, a slightly more pronounced pixel-shift or movement associated with the anterior ribs, and pixel movement associated with the abdominal organs and vessels that is in a different direction than the movement of the posterior and anterior ribs. Digital subtraction angiography (DSA) is a computer-aided image processing method used to enhance vasculature images in which each pixel of data acquired in an X-ray angiography procedure is digitized. DSA relies on the comparison between images taken immediately preceding an injection of a contrast bolus (mask image) and those obtained as the contrast bolus is passing through the target vessels (contrast image). The mask image is digitally subtracted from each of the contrast images resulting in the contrast-filled vessels being rendered on a display free of the background detail contained in the mask image. Additional known image processing functions for further enhancing the final images are performed to produce a series of successive images which are then replayed sequentially enabling a healthcare practitioner to visualize fluid flow through the target vessels.

A pixel-shifted DSA image is acquired by shifting an image relative to a mask (reference) image to align images in a DSA image sequence so that they are aligned to the background within the mask image to improve visualization of contrast enhanced structures. However artifacts arise in processing multiple individual images if one or more individual images exhibit shifts in contrast enhanced structures in a different direction than that of the background i.e. multiple different motion induced shifts occur in a single image.

Known linear pixel-shift systems typically account for one motion field, dependant on the region of interest (ROI) to which the pixel-shift is applied. If a ROI encompasses bones, the bones are shifted in each image to align with a mask image and the vessels are not aligned with each other and are positioned in each subtracted image in a different position. This results in an inferior result when producing a multiple image composition comprising pixel-shifted DSA images. In known systems additional motion applied to contrast enhanced structures impedes evaluation or compositional review of multiple images. A system according to invention principles addresses these deficiencies and associated problems.

SUMMARY OF THE INVENTION

A system improves pixel-shift motion correction in DSA image processing to align the content of individual images of a multi-image sequence with a specific mask image to reduce background motion and to align resulting subtracted images to reduce secondary motion applied to the area of anatomy being imaged. A motion compensated digitally subtracted Angiography (DSA) image processing system includes an interface for acquiring a sequence of images of patient vessels both prior to and following introduction of contrast agent into the vessels. An image data processor automatically, (a) determines a first shift vector for a first image of the sequence for compensating for shift between the first image and a first reference image of the sequence, (b) applies the determined first shift vector to the first image of the sequence to produce a shifted image, (c) subtracts the first reference image from the shifted image to produce a subtracted image enhancing vessel structure, (d) determines a second shift vector for compensating for shift between the subtracted image and a second reference image and (e) shifts content of the subtracted image relative to the second reference image in response to the second shift vector, to provide a shifted subtracted image enhancing and aligning vessel structure.

DETAILED DESCRIPTION OF THE INVENTION

A system according to invention principles employs a multi-level pixel-shift to compensate for an additional motion field associated with contrast enhanced image structures. The system aligns content of individual images of a multi-image sequence to enable improved image to image correlation and multiple image composition. This is accomplished by removing background motion and foreground motion. In this case foreground motion comprises motion applied to an object of interest that is different than the motion applied to image background detail. The system performs a multi-level pixel-shift to align content of multiple images of a pixel-shifted DSA image and to allow improved multiple image processing and compositional review. The system improves pixel-shift motion correction in DSA image processing to align the content of individual images of a multi-image sequence with a specific mask image to reduce background motion and to align resulting subtracted images to reduce secondary motion applied to the area of anatomy being imaged.

Figure 1:
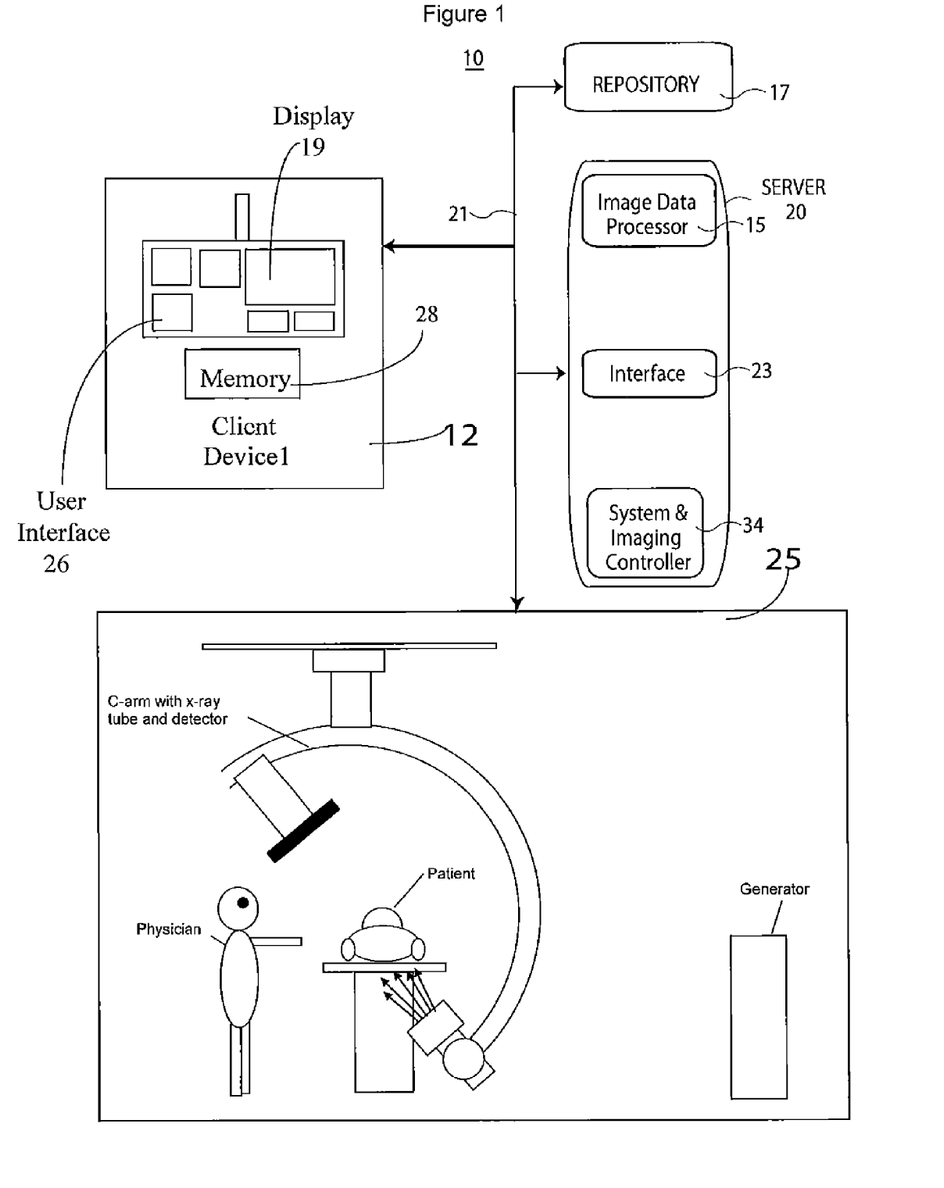
FIG. 1 shows a system for motion compensated digitally subtracted Angiography (DSA) image processing, according to invention principles.

FIG. 1 shows system 10 for motion compensated digitally subtracted Angiography (DSA) image processing. System 10 includes one or more processing devices (e.g., workstations, computers or portable devices such as notebooks, Personal Digital Assistants, phones) 12 that individually include a user interface 26 enabling user interaction with a Graphical User Interface (GUI) and display 19 supporting GUI and medical image presentation in response to predetermined user (e.g., physician) specific preferences. System 10 also includes at least one repository 17, image data processor 15, interface 23 and system and imaging control unit 34. System and imaging control unit 34 controls operation of one or more imaging devices 25 for performing image acquisition of patient anatomy in response to user command. Imaging devices 25 may comprise a single device (e.g., a mono-plane or biplane X-ray imaging system) or multiple imaging devices such as an X-ray imaging system together with a CT scan, MRI device or Ultrasound system, for example). The units of system 10 intercommunicate via network 21. At least one repository 17 stores medical image studies for patients in DICOM compatible (or other) data format. A medical image study individually includes multiple image series of a patient anatomical portion which in turn individually include multiple images. One or more imaging devices 25 acquires multiple DSA sequential images (which may or may not be synchronized with ECG and respiratory signals) of a vessel structure in the presence of a contrast agent in a 3D volume interest. At least one repository 17 stores 2D image data representing a 2D DSA X-ray image sequence through the imaging volume in the presence of a contrast agent.

Interface 23 acquires a sequence of images of patient vessels both prior to and following introduction of contrast agent into the vessels. Image data processor 15 automatically, determines a first shift vector for a first image of the sequence for compensating for shift between the first image and a first reference image (e.g., a mask image) of the sequence and applies the determined first shift vector to the first image of the sequence to produce a shifted image. Processor 15 subtracts the first reference image from the shifted image to produce a subtracted image enhancing vessel structure. Further, processor 15 determines a second shift vector for compensating for shift between the subtracted image and a second reference image (e.g., a contrast entrance image) and shifts content of the subtracted image relative to the second reference image in response to the second shift vector, to provide a shifted subtracted image enhancing and aligning vessel structure.

Figure 2:
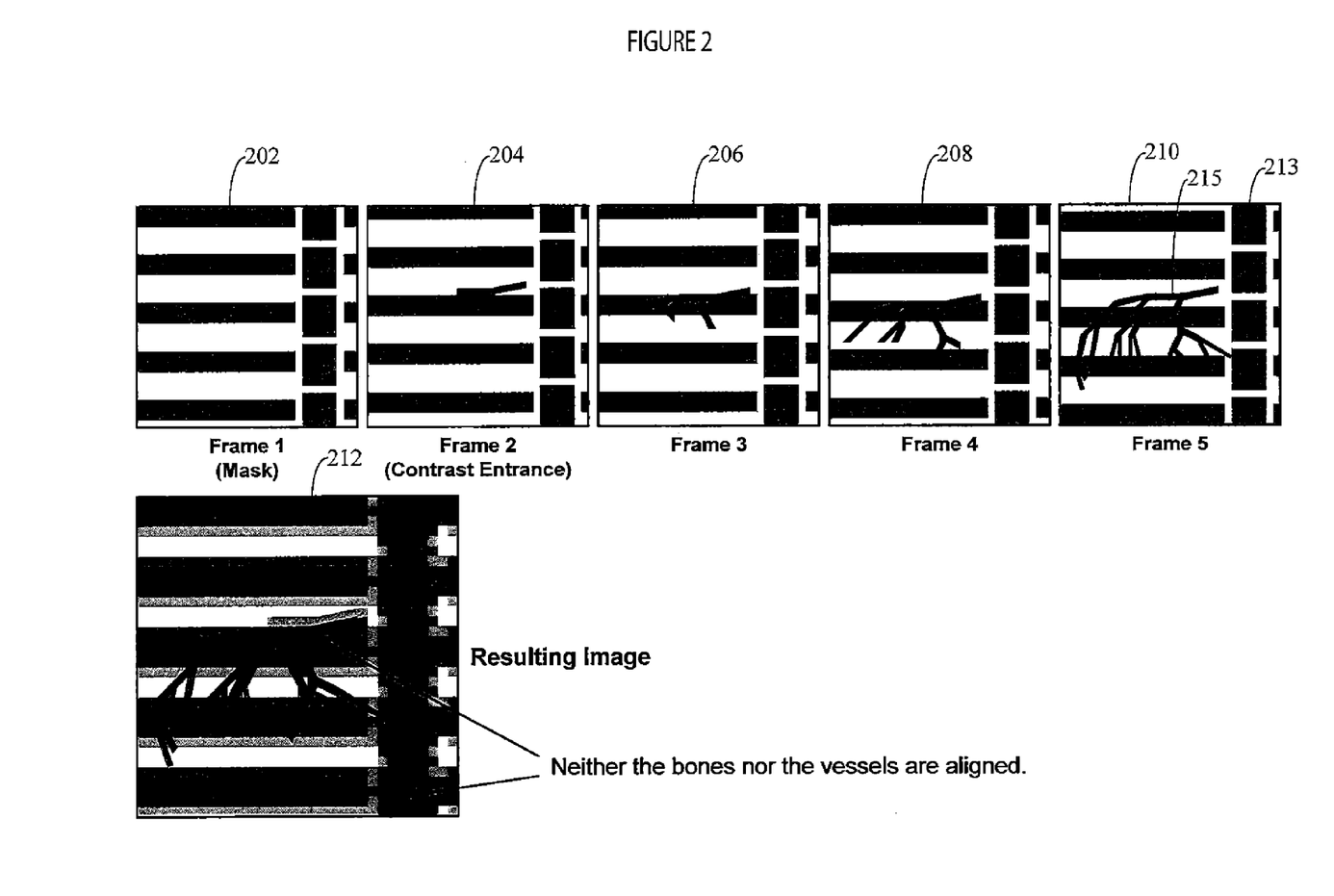
FIG. 2 shows contrast agent enhanced images of vessels acquired in the abdomen exhibiting separate shifts applied to the vessels (e.g. Hepatic artery) and bones (e.g. spine and ribs) resulting in neither the bones nor the vessels being aligned.

FIG. 2 shows a sequence of contrast agent enhanced images 202, 204, 206, 208, 210 of vessels acquired in a patient abdomen by X-ray system 25 (FIG. 1). Movement in patient anatomy during imaging causes, mis-alignment, bluffing and incorrect interpretation when DSA images 204-210 are superimposed and combined in composite image 212. Known systems employ a pixel-shift between individual images to align individual images before forming a composite image but this does not work well when the individual parts of an object move in different relation to each other (e.g. vessels in the abdomen move relative to bones). Composite image 212 exhibits a first shift applied to the vessels 215 (e.g. Hepatic artery) and a second different shift applied to bones 213 (e.g. spine and ribs), for example, resulting in neither the bones nor the vessels being aligned in composite image 212. Image 204 is a contrast agent entrance image comprising a first image in the sequence showing contrast agent.

Figure 3:
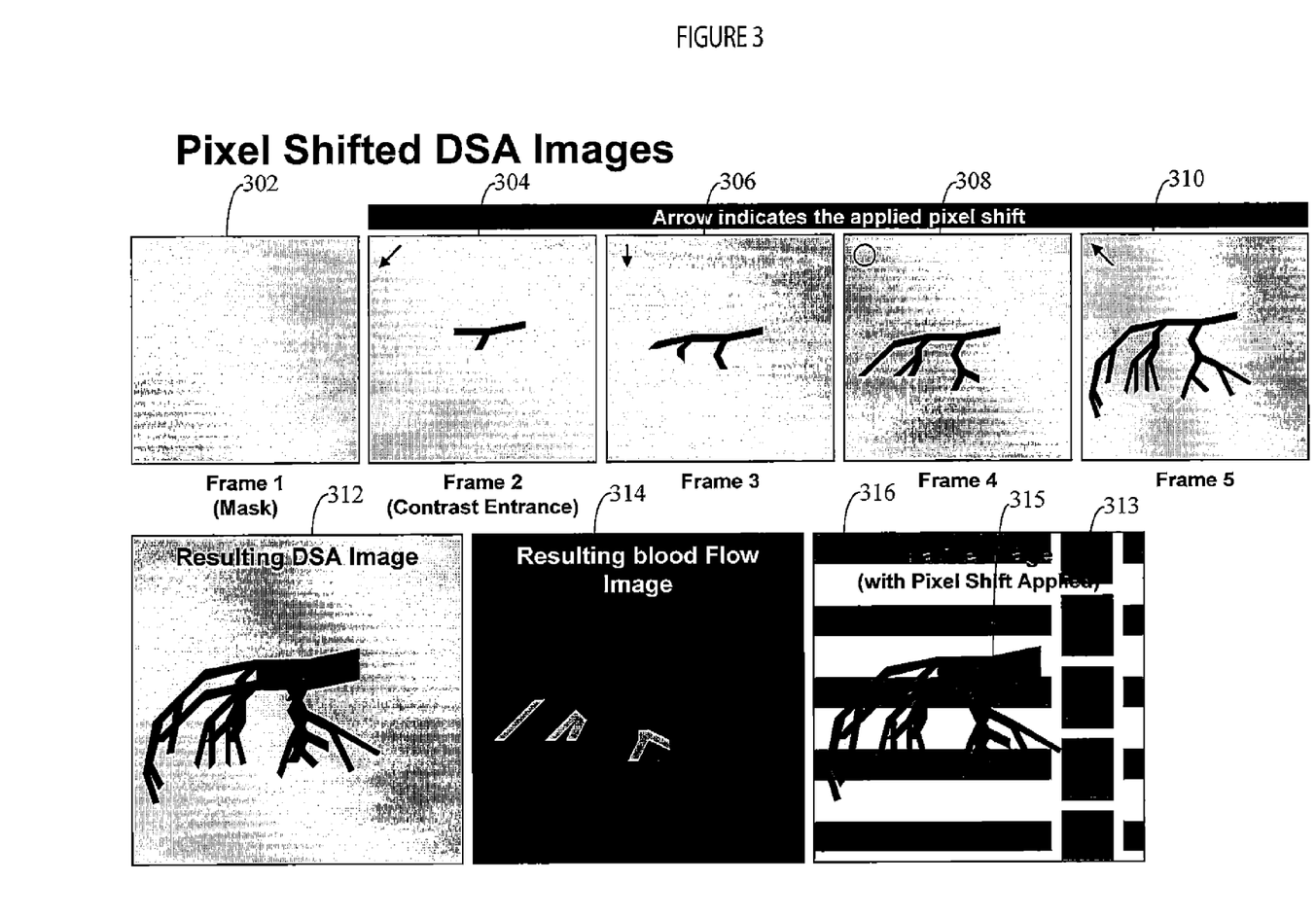
FIG. 3 shows contrast agent enhanced images of vessels acquired in the abdomen exhibiting separate shifts applied to: the vessels (e.g. Hepatic artery) and bones (e.g. spine and ribs) resulting in the bones being aligned but the vessels are not aligned.

FIG. 3 shows a sequence of contrast agent enhanced images 302, 304, 306, 308, 310 of vessels acquired in a patient abdomen by X-ray system 25 (FIG. 1). Movement in patient anatomy during imaging causes mis-alignment, as exhibited when DSA images 204-210 are superimposed and combined in composite image 212. Known systems employ individual pixel-shift between individual images to align the images before forming a composite image. Separate different shifts are applied to individual images 304, 306, 308 and 310 resulting in bones being aligned but vessels are still mis-aligned. Composite images 312, 314 shows vessels of superimposed images 304-310 are still mis-aligned. Composite images 316 shows vessels 315 of superimposed images 304-310 are still mis-aligned and bones 313 (e.g. spine and ribs), for example, are aligned. The anatomy associated movement of the artery and bones still exists in the images, but the system applies a shift to each of the images during subtraction to produce a sequence of DSA images in which the background (e.g. bones) is aligned and removed.

Figure 4:
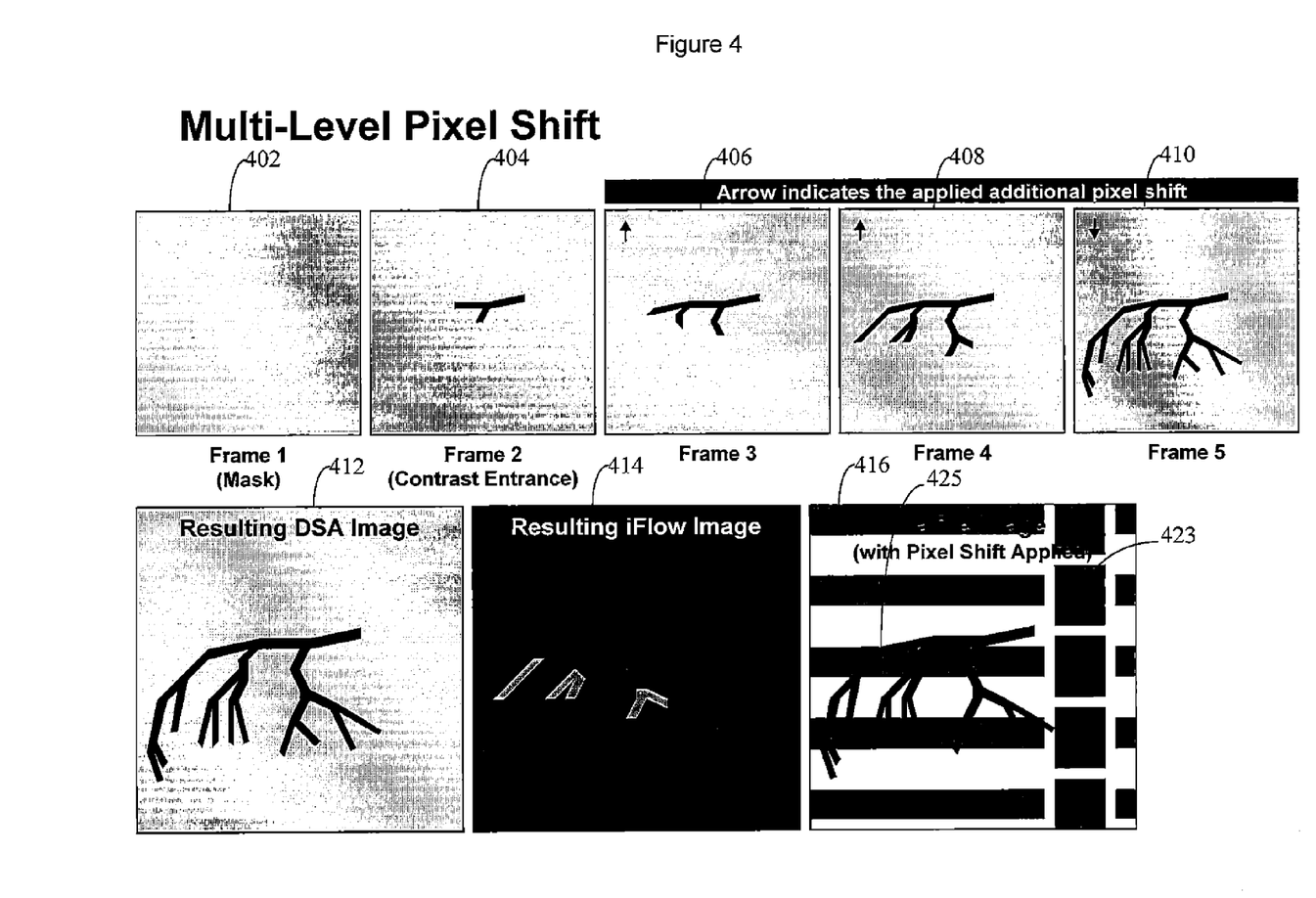
FIG. 4 shows contrast agent enhanced images of vessels acquired in the abdomen with multi-level pixel-shifts applied to: the vessels (e.g. Hepatic artery) and bones (e.g. spine and ribs) resulting in both the bones and vessels being aligned, according to invention principles.

FIG. 4 shows contrast agent enhanced images of vessels acquired in the abdomen with multi-level pixel-shifts applied to the vessels (e.g. Hepatic artery) and bones (e.g. spine and ribs) resulting in both the bones and vessels being aligned. The multi-level pixel-shift is usable for functions that accumulate, process or overlay image information from multiple images. Image data processor 15 automatically identifies an appropriate mask image (image 402) that is acquired in the absence of contrast agent and indicates substantially static background information. The mask image 402 is one of a sequence of images, for example, acquired before the entrance of contrast agent into vessels of an image and if contrast agent X-ray radiation dose regulation is being performed, the mask image comprises an image selected after dose regulation is completed. One embodiment involves selection of an image (e.g. 402) substantially immediately preceding the contrast entrance image (404) as a mask image, but in another embodiment other factors may also be considered (e.g. image location in an image sequence relative to a respiratory cycle, location in an ECG cycle, biological process, or external stimulation).

Image data processor 15 automatically, identifies a region of interest (ROI) in mask image 402 and associated first pixel-shifts (of the background) of the ROI. Specifically, processor 15 determines multiple first shift vectors for the ROI of corresponding multiple images of the sequence for compensating for shift between individual images of the multiple images and mask image 402 (a first reference image) of the sequence. Processor 15 automatically selects a ROI (or in another embodiment it is selected by a user). Automatic selection of the ROI is performed by processor 15 in response to image acquisition program settings, data identifying a clinical procedure, or image analysis. In one embodiment, image analysis is employed to detect specific anatomy (e.g., spine, ribs, skull, or other bony structure) associated with a ROI and the detected anatomy is used to determine the ROI comprising a predetermined area associated with the detected particular anatomical features. The system selects a ROI that includes static background image content that does not vary (or varies only slightly) between images in sequence 402-410.

Image data processor 15 automatically applies the determined first shift vectors to corresponding multiple images of the sequence to produce multiple shifted images 404-410. Processor 15 automatically shifts images in the image sequence (or at least images following contrast entrance), using a fixed shift vector that when applied to an individual selected image minimizes the difference between the individual selected image and mask image 402. Processor 15 subtracts the mask (first reference) image from the multiple shifted images to produce subtracted images comprising a digitally subtracted Angiography (DSA) sequence enhancing vessel structure. Thereby processor 15 derives individual images of a standard DSA image sequence by applying a shift vector of each image to that image and subtracting the mask image.

Processor 15 identifies contrast enhanced images (corresponding to 404, 406, 408, and 410) in the image sequence and the first image (404) in the sequence first exhibiting presence of contrast agent (a contrast agent entrance image). Processor 15 identifies contrast agent enhanced images in an image sequence, by in one embodiment, for individual images of a sequence, deriving a histogram as a measure representative of luminance content of each individual image. Processor 15 compares differences between the histogram measures of successive images. In the histogram, a horizontal axis represents each possible luminance pixel value from black to white. The vertical axis indicates values representing the number of pixels in the image that occur at each luminance pixel value level. Processor 15 generates and analyzes histograms for a ROI (or the whole image) of individual images. Processor 15 processes the pixel data within a determined ROI to derive the ROI pixel luminance (e.g., grayscale) distribution comprising a histogram. Processor 15 compares and correlates histogram data representing successive images of a medical image sequence of a patient anatomical portion to identify a first image of a sequence in which change of luminance data (e.g., increased darkness representing Iodine contrast agent) occurs in the sequence to determine when the contrast agent enters the ROI and to identify images containing contrast agent. In response to determining a difference in measures representative of luminance content (histograms) of an image exceeding a predetermined threshold. Image processor 15 selects an image comprising the image immediately preceding the contrast agent entrance image as a Mask image. Processor 15 also initiates image comparison after administration of the contrast agent to ensure that there is sufficient background image variation for acquiring histogram data for comparison and correlation.

Image data processor 15 automatically (or in response to user command) identifies a ROI in the contrast enhanced structures (foreground) of images corresponding to images 404-410. Automatic selection of the ROI is performed by processor 15 based on image acquisition program settings, data identifying a clinical procedure, or image analysis. Image analysis in one embodiment is used to detect a fixed size ROI that contains the highest concentration of contrast enhanced pixels to select a ROI that encompasses a large portion of the contrast enhanced structure. Automatic selection of the ROI is also performed using image analysis to detect specific anatomy (e.g. spine, ribs, skull, or other bony structure) associated with a ROI and the detected anatomy is used to determine the ROI comprising a predetermined area associated with the detected particular anatomical features. The system selects a ROI as comprising static background image content that does not vary (or varies only slightly) between images in a sequence.

Processor 15 automatically shifts contrast agent enhanced images (following the first contrast entrance image) in the DSA image sequence. Image data processor 15 determines multiple second shift vectors for corresponding multiple images of the DSA sequence exhibiting presence of contrast agent for compensating for shift between individual images of the images of the DSA sequence and a contrast agent entrance image of the DSA sequence. In one embodiment processor 15 determines multiple second shift vectors for compensating for shift between a subtracted image and an image immediately preceding the subtracted image. The pixel-shift applied to each image is a pixel-shift relative to the contrast entrance image. In another embodiment, processor 15 determines multiple second shift vectors for compensating for shift between individual subtracted images of the DSA sequence and a contrast agent entrance image of the DSA sequence.

Processor 15 shifts content of the individual images of the multiple images of the DSA sequence relative to the contrast entrance image in response to the second shift vector, to provide a shifted DSA sequence enhancing and aligning vessel structure. This pixel-shift is advantageously different to conventional pixel-shift calculations in that shift vectors are determined to be relative to a contrast entrance image. The shift vector for an individual image determines the shift vector that aligns the individual image to the pixel coordinate space of the contrast entrance image. This pixel-shift can either be determined for a given image by comparing the image against the contrast entrance image or against the image immediately preceding the given image. In one embodiment the system uses the mask image instead of the contrast entrance image if there is sufficient similarity between the contrast entrance image and contrast enhanced images (as is the case in a continuous contrast injection into a vessel, for example). Short intra-arterial contrast injections do not have similar content between the contrast entrance image and the subsequent images because the contrast bolus flows through the vasculature and is absent in later images from the arteries in which the contrast agent is present in earlier images.

A resulting image 412 shows the vessels are aligned following superimposing images 404-410 and a similar composite flow image may be generated in different colors (represented by gray shades in image 414) that shows progression of blood flow through the vessel structure upon contrast agent injection. Image 416 shows both vessels 425 and bones 415 are aligned.

The position of the foreground ROI is variable and determined for each image and processor 15 iteratively removes the effects of more than two types of motion. The system in one embodiment adaptively selects a pixel-shift function to avoiding need to select a background ROI. Quality measurements of individual pixel-shift results are used to determine if a calculated shift vector is valid or to adjust or interpolate a shift vector to find a better one. The system is applicable to multiple images of a sequence in which there are multiple objects in motion (for example, security imaging, scientific image analysis (e.g. microscopy, astronomy)). The system advantageously uses multiple levels of pixel-shift to compensate for multiple types of motion occurring in content of an imaged area and is used to process multiple images or to combine multiple images for display. The system automatically determines positions of multiple regions of interest associated with different corresponding motion vectors in an image or in another embodiment a user manually identifies and positions these regions of interest. The system performs the multi-level pixel-shift and the processing, superimposition or combination of multiple images.

Figure 5:
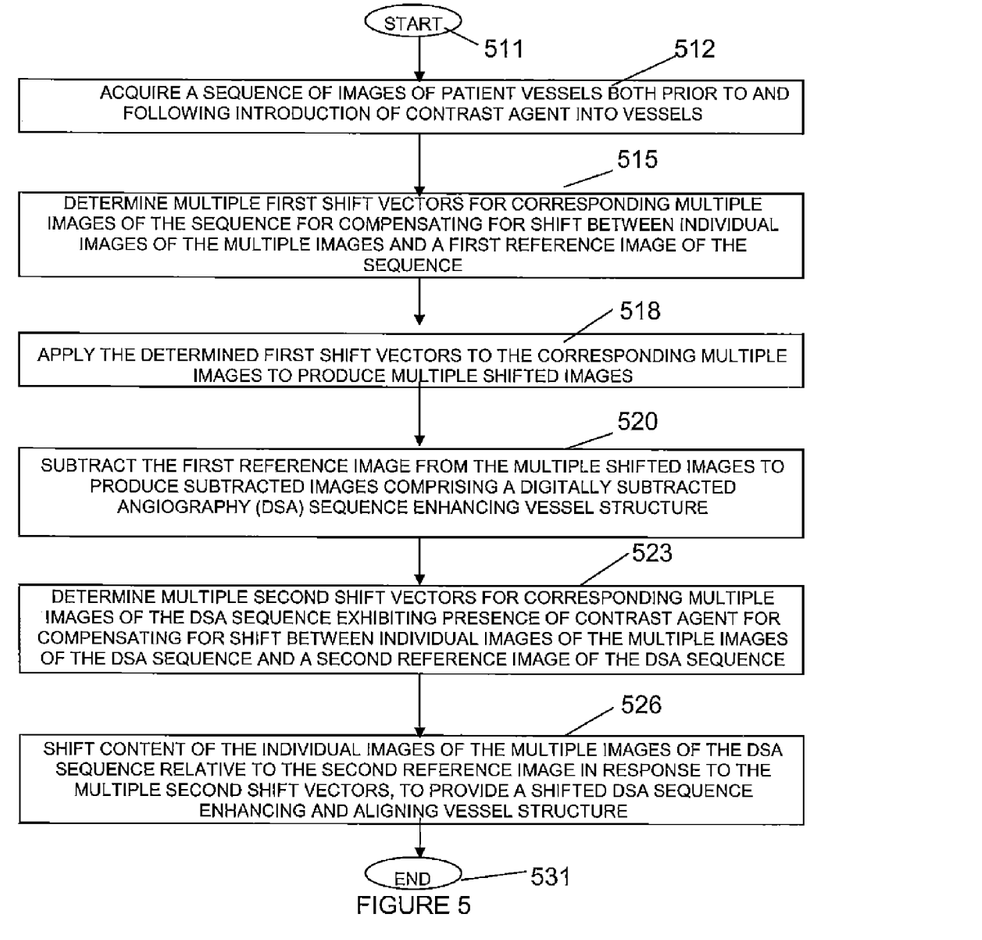
FIG. 5 shows a flowchart of a process performed by the system for motion compensated digitally subtracted Angiography (DSA) image processing, according to invention principles.

FIG. 5 shows a flowchart of a process performed by system 10 (FIG. 1) for motion compensated digitally subtracted Angiography (DSA) image processing. In step 512 following the start at step 511, interface 23 acquires a sequence of images of patient vessels both prior to and following introduction of contrast agent into the vessels. In step 515 image data processor 15 automatically determines multiple first shift vectors for corresponding multiple images of the sequence (and determines a first shift vector for a first image of the sequence) for compensating for shift between individual images of the multiple images and a first reference image of the sequence. In one embodiment, the first reference image comprises a mask image indicating background image features that is acquired in the absence of contrast agent. Processor 15 in step 518 applies the determined first shift vectors to the corresponding multiple images (and applies a determined first shift vector to a first image of the sequence) to produce multiple shifted images. In step 520 processor 15 subtracts the first reference image from the multiple shifted images to produce subtracted images comprising a digitally subtracted Angiography (DSA) sequence enhancing vessel structure.

In step 523, processor 15 determines multiple second shift vectors for corresponding multiple images of the DSA sequence exhibiting presence of contrast agent for compensating for shift between individual images of the multiple images of the DSA sequence and a second reference image of the DSA sequence. This includes determining a second shift vector for compensating for shift between an individual subtracted image and a second reference image. Specifically, in one embodiment, processor 15 determines multiple second shift vectors for corresponding multiple images of the DSA sequence exhibiting presence of contrast agent for compensating for shift between individual images of the multiple images of the DSA sequence and corresponding respective immediately preceding images of the individual images of the multiple images of the DSA sequence. In another embodiment, a second reference image is derived by subtracting the first reference image from a contrast entrance image (a first image in the sequence exhibiting presence of contrast agent). The first and second shift vectors individually comprise different single shifts uniformly shifting positions of the pixels in an image a particular distance in a particular direction. Processor 15 in step 526 shifts content of the individual images of the multiple images of the DSA sequence relative to the second reference image in response to the multiple second shift vectors, to provide a shifted DSA sequence enhancing and aligning vessel structure. This includes shifting content of the individual subtracted image relative to the second reference image in response to the second shift vector, to provide a shifted subtracted image enhancing and aligning vessel structure.

Image data processor 15 performs step 515, 518, 520, 523 and 526 for a sequential plurality of images of the sequence that exhibit contrast agent and are subsequent to the reference image in the sequence to provide a sequence of multiple shifted subtracted images enhancing and aligning vessel structure comprising a digitally subtracted Angiography (DSA) sequence. Processor 15 in one embodiment, automatically determines the first shift vector for a first region of interest in the sequence and automatically determines the second shift vector for a second region of interest in the digitally subtracted Angiography (DSA) sequence. Processor 15 automatically determines the first region of interest and the second region of interest in response to at least one of, (a) predetermined configuration data and (b) data identifying a type of clinical procedure. In another embodiment, processor 15 automatically determines the first region of interest and the second region of interest in response to image analysis. Further, the image analysis determines the first region of interest and the second region of interest in response to at least one of, (a) determined concentration of contrast agent enhanced pixels and (b) detection of anatomical features and a predetermined area associated with the detected anatomical features. In another embodiment, processor 15 automatically determines the first region of interest and the second region of interest in response to user data entry. In one embodiment the image data processor automatically determines the first region of interest and the second region of interest in response to image analysis and the second region of interest can either be a fixed region that is used for all images in the sequence or a dynamic region that may be different for each image in the sequence. In one embodiment, the image data processor automatically determines a plurality of different second regions of interest in response to image analysis and determines and applies a corresponding plurality of different second shift vectors associated with the different second regions. The process of FIG. 5 terminates at step 531.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication therebetween. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouth, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1, 4 and 5 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A system automatically uses a first shift vector to shift images in an acquired image sequence relative to a mask image, subtracts the mask image to form a DSA sequence and shifts image of the DSA sequence relative to a contrast entrance image of the sequence using a second shift vector. Further, the processes and applications may, in alternative embodiments, be located on one or more (e.g., distributed) processing devices on a network linking the units of FIG. 1. Any of the functions and steps provided in FIGS. 1, 4 and 5 may be implemented in hardware, software or a combination of both.

What is claimed is:

1. A motion compensated digitally subtracted Angiography (DSA) image processing system, comprising:
    an interface for acquiring a sequence of images of patient vessels both prior to and following introduction of contrast agent into the vessels; and
    an image data processor for automatically,
        (a) determining a first shift vector, for a first image of said sequence for compensating for shift between said first image and a first reference image of said sequence,
        (b) applying the determined first shift vector to said first image of said sequence to produce a shifted image,
        (c) subtracting said first reference image from said shifted image to produce a subtracted image enhancing vessel structure,
        (d) determining a second shift vector for compensating for shift between said subtracted image and a second reference image and
        (e) shifting content of said subtracted image relative to said second reference image in response to said second shift vector, to provide a shifted subtracted image enhancing and aligning vessel structure.

2. A system according to claim 1, wherein
said first reference image comprises a mask image indicating background image features and is acquired in the absence of contrast agent.

3. A system according to claim 1, wherein
said second reference image is derived by subtracting said first reference image from a second image of said sequence.

4. A system according to claim 3, wherein
said second reference image is derived from a first image in said sequence exhibiting presence of contrast agent.

5. A system according to claim 1, wherein
said image data processor determines a second shift vector for compensating for shift between said subtracted image and a second reference image comprising an image immediately preceding said subtracted image.

6. A system according to claim 1, wherein
the first and second shift vectors individually comprise different single shifts each uniformly shifting positions of the pixels in an image a particular distance in a particular direction.

7. A system according to claim 1 wherein
said image data processor performs step a, b, c, d and e for a sequential plurality of images of said sequence that exhibit contrast agent and are subsequent to said reference image in said sequence to provide a sequence of a plurality of shifted subtracted images enhancing and aligning vessel structure comprising a digitally subtracted Angiography (DSA) sequence.

8. A system according to claim 7 wherein
said image data processor,
    automatically determines said first shift vector for a first region of interest in said sequence and
    automatically determines said second shift vector for a second region of interest in said digitally subtracted Angiography (DSA) sequence.

9. A system according to claim 7 wherein
said image data processor automatically determines said first region of interest and said second region of interest in response to at least one of, (a) predetermined configuration data and (b) data identifying a type of clinical procedure.

10. A system according to claim 7 wherein
said image data processor automatically determines said first region of interest and said second region of interest in response to image analysis and
said image analysis determines said first region of interest and said second region of interest in response to at least one of, (a) determined concentration of contrast agent enhanced pixels and (b) detection of anatomical features and a predetermined area associated with the detected anatomical features.

11. A system according to claim 7 wherein
said image data processor automatically determines said first region of interest and said second region of interest in response to image analysis and
said second region of interest can either be a fixed region that is used for all images in the sequence or a dynamic region that may be different for each image in the sequence.

12. A system according to claim 7 wherein
said image data processor automatically determines said first region of interest and said second region of interest in response to user data entry.

13. A system according to claim 7 wherein
said image data processor automatically determines a plurality of different second regions of interest in response to image analysis and
said image data processor determines and applies a corresponding plurality of different second shift vectors associated with the different second regions.

14. A motion compensated digitally subtracted Angiography (DSA) image processing system, comprising:
    an interface for acquiring a sequence of images of patient vessels both prior to and following introduction of contrast agent into the vessels; and
    an image data processor for automatically,
        (a) determining a plurality of first shift vectors for a corresponding plurality of images of said sequence for compensating for shift between individual images of said plurality of images and a first reference image of said sequence,
        (b) applying the determined first shift vectors to said corresponding plurality of images to produce a plurality of shifted images,
        (c) subtracting said first reference image from said plurality of shifted images to produce subtracted images comprising a digitally subtracted Angiography (DSA) sequence enhancing vessel structure,
(d) determining a plurality of second shift vectors for a corresponding plurality of images of the DSA sequence exhibiting presence of contrast agent for compensating for shift between individual images of said plurality of images of said DSA sequence and a second reference image of the DSA sequence and
(e) shifting content of said individual images of said plurality of images of said DSA sequence relative to said second reference image in response to said plurality of second shift vectors, to provide a shifted DSA sequence enhancing and aligning vessel structure.

15. A system according to claim 14, wherein said first reference image comprises a mask image indicating background image features and is acquired in the absence of contrast agent.

16. A system according to claim 14, wherein said second reference image is derived by subtracting said first reference image from a second image of said sequence.

17. A system according to claim 16, wherein said second reference image is derived from a first image in said sequence exhibiting presence of contrast agent.

18. A system according to claim 17, wherein a second reference image comprises an immediately preceding image of each individual image of said plurality of images of said DSA sequence.

19. A motion compensated digitally subtracted Angiography (DSA) image processing system, comprising:
an interface for acquiring a sequence of images of patient vessels both prior to and following introduction of contrast agent into the vessels; and
an image data processor for automatically,
(a) determining a plurality of first shift vectors for a corresponding plurality of images of said sequence for compensating for shift between individual images of said plurality of images and a first reference image of said sequence,
(b) applying the determined first shift vectors to said corresponding plurality of images to produce a plurality of shifted images,
(c) subtracting said first reference image from said plurality of shifted images to produce subtracted images comprising a digitally subtracted Angiography (DSA) sequence enhancing vessel structure,
(d) determining a plurality of second shift vectors for a corresponding plurality of images of the DSA sequence exhibiting presence of contrast agent for compensating for shift between individual images of said plurality of images of said DSA sequence and corresponding respective immediately preceding images of said individual images of said plurality of images of said DSA sequence; and
(e) shifting content of said individual images of said plurality of images of said DSA sequence relative to said second reference image in response to said plurality of second shift vectors, to provide a shifted DSA sequence enhancing and aligning vessel structure.

20. A method for providing motion compensated digitally subtracted Angiography (DSA) images, comprising the activities of:
acquiring a sequence of images of patient vessels both prior to and following introduction of contrast agent into the vessels; and
automatically,
(a) determining a first shift vector for a first image of said sequence for compensating for shift between said first image and a first reference image of said sequence,
(b) applying the determined first shift vector to said first image of said sequence to produce a shifted image,
(c) subtracting said first reference image from said shifted image to produce a subtracted image enhancing vessel structure,
(d) determining a second shift vector for compensating for shift between said subtracted image and a second reference image and
(e) shifting content of said subtracted image relative to said second reference image in response to said second shift vector, to provide a shifted subtracted image enhancing and aligning vessel structure.

21. A method according to claim 20, wherein said second reference image is derived by subtracting said first reference image from a second image of said sequence.

22. A method according to claim 21, wherein said second reference image is derived from a first image in said sequence exhibiting presence of contrast agent.

23. A method according to claim 20, wherein said activity of determining a second shift vector comprises determining a second shift vector for compensating for shift between said subtracted image and a second reference image comprising an image immediately preceding said subtracted image.

* * * * *